United States Patent
Sugawara et al.

(10) Patent No.: US 11,927,218 B2
(45) Date of Patent: Mar. 12, 2024

(54) SEALING DEVICE AND METHOD FOR APPLYING GREASE THERETO

(71) Applicant: NOK CORPORATION, Tokyo (JP)

(72) Inventors: Shintaro Sugawara, Fukushima (JP); Masahiro Seki, Fukushima (JP); Yuichi Tarukawa, Fukushima (JP)

(73) Assignee: NOK CORPORATION, Tokyo (JP)

( * ) Notice: Subject to any disclaimer, the term of this patent is extended or adjusted under 35 U.S.C. 154(b) by 421 days.

(21) Appl. No.: 17/281,045

(22) PCT Filed: Nov. 5, 2019

(86) PCT No.: PCT/JP2019/043234
§ 371 (c)(1),
(2) Date: Mar. 29, 2021

(87) PCT Pub. No.: WO2020/100651
PCT Pub. Date: May 22, 2020

(65) Prior Publication Data
US 2021/0355995 A1    Nov. 18, 2021

(30) Foreign Application Priority Data
Nov. 12, 2018   (JP) ................................ 2018-212077

(51) Int. Cl.
*F16C 33/66* (2006.01)
*F16C 19/18* (2006.01)
(Continued)

(52) U.S. Cl.
CPC .............. *F16C 33/78* (2013.01); *F16C 19/18* (2013.01); *F16C 19/186* (2013.01);
(Continued)

(58) Field of Classification Search
CPC .... F16C 19/18; F16C 19/186; F16C 33/6603; F16C 33/6622; F16C 33/78;
(Continued)

(56) References Cited

U.S. PATENT DOCUMENTS

| 6,186,507 | B1 | 2/2001 | Oldenburg |
| 7,909,333 | B2 * | 3/2011 | Greca ................. F16J 15/3264 277/577 |

(Continued)

FOREIGN PATENT DOCUMENTS

| CN | 205858773 U | 1/2017 |
| EP | 3 299 683 | 3/2018 |

(Continued)

OTHER PUBLICATIONS

Extended European Search Report received in EP Application No. 19 885 076.0, dated Dec. 3, 2021.

(Continued)

*Primary Examiner* — Phillip A Johnson
(74) *Attorney, Agent, or Firm* — Greenblum & Bernstein, P.L.C.

(57) ABSTRACT

A sealing device is disposed between an inner member and an outer member that rotate relative to each other to seal a gap between the inner member and the outer member of the sealing device, and includes a first sealing member including a cylindrical part to be mounted to the outer member, and an annular part that extends radially inward from the cylindrical part toward the inner member; and a second sealing member including a sleeve to be mounted to the inner member, and a flange that extends radially outward from the sleeve, the flange facing the annular part of the first sealing member. The first sealing member includes at least three axial lips made from an elastic material that extends from the annular part toward the flange of the second sealing member. An axial lip disposed radially outer side has an interference that is greater than that of an axial lip disposed radially inner side.

3 Claims, 3 Drawing Sheets

(51) Int. Cl.
*F16C 33/78* (2006.01)
*F16J 15/3232* (2016.01)
*F16J 15/324* (2016.01)

(52) U.S. Cl.
CPC ...... *F16C 33/6603* (2013.01); *F16C 33/7823* (2013.01); *F16C 33/7883* (2013.01); *F16J 15/3232* (2013.01); *F16J 15/324* (2013.01); *F16C 2326/02* (2013.01)

(58) Field of Classification Search
CPC .............. F16C 33/7823; F16C 33/7873; F16C 33/7876; F16C 33/7883; F16J 15/3232; F16J 15/324
See application file for complete search history.

(56) References Cited

U.S. PATENT DOCUMENTS

| | | | | |
|---|---|---|---|---|
| 9,623,703 | B2 * | 4/2017 | Shibata | ............... F16C 33/7879 |
| 2007/0090604 | A1 * | 4/2007 | Shibayama | ......... F16C 33/7883 |
| | | | | 277/349 |
| 2011/0262069 | A1 | 10/2011 | Baba et al. | |
| 2018/0156277 | A1 | 6/2018 | Yamane et al. | |

FOREIGN PATENT DOCUMENTS

| | | | | |
|---|---|---|---|---|
| JP | H5-263989 | A | | 10/1993 |
| JP | H6-300140 | A | | 10/1994 |
| JP | 2001-165179 | A | | 6/2001 |
| JP | 2003-314698 | A | | 11/2003 |
| JP | 2005330987 | A * | 12/2005 | .......... F16C 33/7873 |
| JP | 2007-100826 | | | 4/2007 |
| JP | 2007-100882 | A | | 4/2007 |
| JP | 2009-287651 | A | | 12/2009 |
| JP | 2010096194 | A * | 4/2010 | .......... F16C 33/7876 |
| JP | 2010-159791 | A | | 7/2010 |
| JP | 2010230059 | A * | 10/2010 | .......... F16C 33/7823 |
| JP | 2015-124785 | A | | 7/2015 |
| KR | 20140021427 | A * | 2/2014 | |
| WO | WO-2010079734 | A1 * | 7/2010 | ......... B60B 27/0073 |

OTHER PUBLICATIONS

Japan Official Action received in JP Application No. 2020-556069, dated Nov. 22, 2022.
Notice of Reasons for Refusal received in JP Application No. 2020-556069, dated May 24, 2022.
First Office Action issued in Chinese Patent Application No. 201980063329.3 dated Oct. 9, 2022.
ISR for PCT/JP2019/043234, dated Dec. 17, 2019.

* cited by examiner

SEALING DEVICE AND METHOD FOR APPLYING GREASE THERETO

TECHNICAL FIELD

The present invention relates to sealing devices and to methods for applying grease thereto.

BACKGROUND ART

Rolling bearings, such as ball bearings are well known and are used, for example, in automotive vehicle hubs. Patent Document 1 discloses a sealing device that seals an inside of a rolling bearing. The sealing device includes a slinger mounted to an inner race of the rolling bearing, and a seal mounted to an outer member of the rolling bearing. The seal has multiple lips that are in slidable contact with the slinger.

BACKGROUND DOCUMENTS

Patent Document

Patent Document 1: JP-A-2010-159791

SUMMARY OF THE INVENTION

The type of sealing device described above has a function of sealing to prevent foreign matter, such as water (including muddy water and salt water) and dust from intruding into the inside of the bearing. In particular, if the sealing device is intended for use in a flooded environment, a need exists to enhance prevention of intrusion of water into the interior of a sealed object (e.g., a bearing).

In addition, it is desirable that lubricant grease be able to be applied with ease to a lip even if the sealing device has multiple lips.

The present invention provides a sealing device that has a superior ability to prevent intrusion of water into a sealed object and enables grease to be applied with ease to lips of the sealing device, and also provides a method for applying grease with ease to lips of the sealing device.

According to an aspect of the present invention, there is provided a sealing device disposed between an inner member and an outer member that rotate relative to each other, and that acts to seal a gap between the inner member and the outer member, the sealing device including a first sealing member including a cylindrical part to be mounted to the outer member, and an annular part that extends radially inward from the cylindrical part toward the inner member; and a second sealing member including a sleeve to be mounted to the inner member, and a flange that extends radially outward from the sleeve, the flange facing the annular part of the first sealing member. The first sealing member includes at least three axial lips made from an elastic material that extends from the annular part toward the flange of the second sealing member. An axial lip disposed on a radially outer side has an interference that is greater than that of an axial lip disposed on a radially inner side.

In this aspect, since the first sealing member includes at least three axial lips, the sealing device has a superior ability to prevent intrusion of water into the sealed object. Since the axial lip disposed on the radially outer side has an interference that is greater than that of the axial lip disposed on the radially inner side, the axial lip disposed on the radially outer side is more curved than the axial lip disposed on the radially inner side. Accordingly, as compared with the opposite case, more axial lips can be arranged in a narrower area. Since the axial lip disposed on the radially outer side has an interference that is greater than that of the axial lip disposed on the radially inner side, it is easy to apply grease to the axial lips by supplying the grease to the inner peripheral surface of each axial lip from radially inside the axial lips.

A grease applying method according to an aspect of the present invention is a method for applying grease to an inner peripheral surface of each axial lip of the sealing device, including supplying the grease to the inner peripheral surface of each axial lip from radially inside the axial lips.

In accordance with this method, since the axial lip disposed on the radially outer side has an interference greater than that of the axial lip disposed on the radially inner side, it is easy to apply grease to each axial lip by supplying the grease to the inner peripheral surface of each axial lip from radially inside the axial lips.

Preferably, supplying the grease to the inner peripheral surface includes spraying drops of the grease from radially inside the axial lip disposed on the innermost side in a radial direction, whereby the grease can be simultaneously applied to the inner peripheral surface of each axial lip. In this case, since the grease can be applied at the same time to the inner peripheral surface of each axial lip, a high work rate is attained.

DESCRIPTION OF EMBODIMENT

Hereinafter, with reference to the accompanying drawings, an embodiment according to the present invention will be described. It is of note that the drawings do not necessarily accurately show dimensional ratios of actual products according to the embodiment and some dimensions may be exaggerated.

Figure 1:
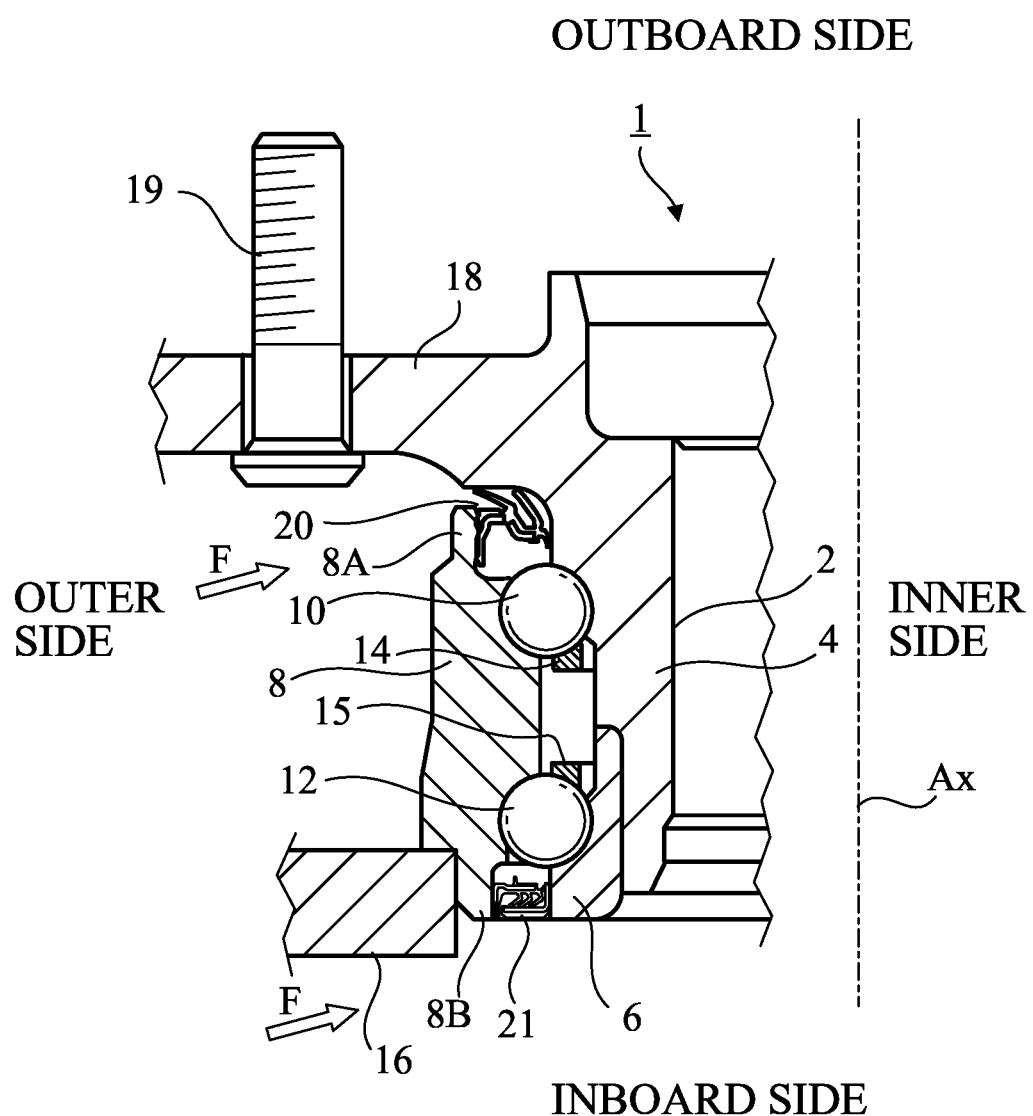
FIG. 1 is a partial cross-sectional view of an example of a rolling bearing in which a sealing device according to an embodiment of the present invention is used.

FIG. 1 shows an automotive vehicle hub bearing, which is an example of a rolling bearing in which a sealing device according to any one of the embodiments of the present invention is used. The present invention is not limited to hub bearings, and is applicable to other types of rolling bearings. In the following description, the hub bearing is a ball bearing. Again, the present invention is not limited to ball bearings, and is applicable to other types of rolling bearings, such as roller bearings and needle bearings, and other types of rolling elements. The present invention is also applicable to rolling bearings used in machines other than automotive vehicles.

The hub bearing 1 includes a hub 4 (inner member) that has a hole 2 into which a spindle (not shown) is inserted, an inner race 6 (inner member) mounted to the hub 4, an outer race 8 (outer member) located outside the hub 4 and the inner race 6, multiple balls 10 arranged in a row between the hub 4 and the outer race 8, multiple balls 12 arranged in a row between the inner race 6 and the outer race 8, and multiple retainers 14 and 15 that retain the balls in place.

Whereas the outer race 8 remains stationary, the hub 4 and the inner race 6 rotate with the spindle.

In FIG. 1, the central axis Ax common to the spindle and hub bearing 1 extends in a vertical direction. In FIG. 1, relative to the central axis Ax only the left part is shown; and although not shown in detail, in FIG. 1 the upper side corresponds to the outer side (outboard side) of the automotive vehicle on which wheels are arranged, while the lower side corresponds to the inner side (inboard side) on which differential gears are arranged. In FIG. 1, the outer side and the inner side are shown in their respective radial directions.

The outer race 8 of the hub bearing 1 is mounted to the hub knuckle 16. The hub 4 has an outboard side flange 18 that extends radially further outward than the outer race 8. A wheel can be mounted to the outboard side flange 18 by hub bolts 19.

A sealing device 20 that seals a gap between the outer race 8 and the hub 4 is located close to the end of the outer race 8 on the outboard side, and inside the end of the outer race 8 on the inboard side. Another sealing device 21 that seals a gap between the outer race 8 and the inner race 6 is located inside the end of the inner side of the outer race 8. The sealing devices 20 and 21 prevent outflow of a lubricant in the form of grease from the interior of the hub bearing 1, and prevent intrusion of foreign matter (water, including muddy water and salt water) into the interior of the hub bearing 1 from the outside. In FIG. 1, arrows F indicate an example direction of an exterior flow of foreign matter.

The sealing device 20 is located between the rotatable hub 4 and the cylindrical end portion 8A on the outboard side of the stationary outer race 8 of the hub bearing 1, and seals the gap between the outer race 8 and the hub 4. The sealing device 21 is located between the rotatable inner race 6 and the end portion 8B on the inboard side of the outer race 8 of the hub bearing 1, and seals the gap between the outer race 8 and the inner race 6.

Figure 2:
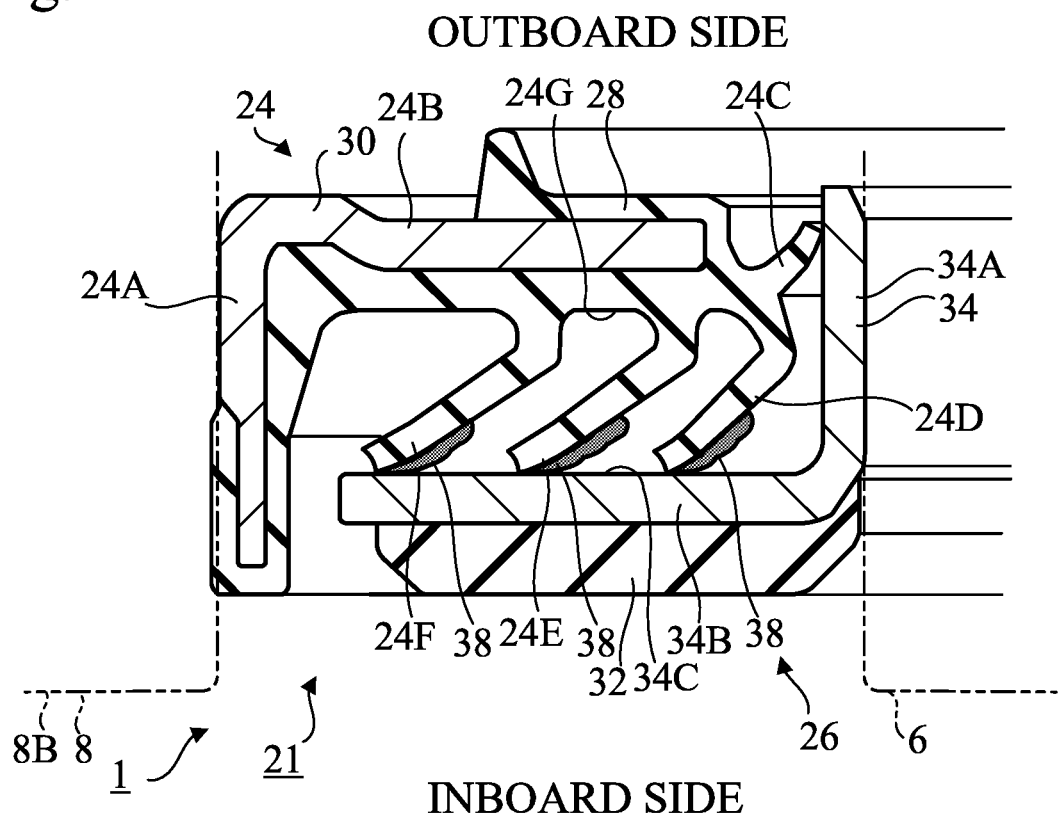
FIG. 2 is a partial cross-sectional view of a sealing device according to an embodiment of the present invention.

As shown in FIG. 2, the sealing device 21 is provided in a gap between the end portion 8B on the inboard side of the outer race 8 of the hub bearing 1 and the inner race 6 of the hub bearing 1. The sealing device 21 is annular in shape; although, in FIG. 2 only the left part of the sealing device 21 is shown.

The sealing device 21 has a composite structure that includes a first sealing member 24 and a second sealing member 26.

The first sealing member 24 is a stationary sealing member that is mounted to the outer race 8 and does not rotate. The first sealing member 24 has a composite structure and includes an elastic ring 28 and a rigid ring 30. The elastic ring 28 is made of an elastic material such as an elastomer. The rigid ring 30 is made of a rigid material such as a metal and reinforces the elastic ring 28. As viewed in cross section, the rigid ring 30 is substantially L-shaped. A part of the rigid ring 30 is embedded in the elastic ring 28 and is in close contact with the elastic ring 28.

The first sealing member 24 has a cylindrical part 24A, an annular part 24B, a radial lip 24C, and axial lips 24D, 24E, and 24F. The cylindrical part 24A constitutes a mounted part that is to be mounted to the outer race 8. More specifically, the cylindrical part 24A is engaged by interference fit, namely, is press-fitted into the end portion 8B of the outer race 8. The annular part 24B, which has a circular annular shape, is located radially inside the cylindrical part 24A and extends radially inward toward the inner race 6. The cylindrical part 24A and the annular part 24B are formed from the rigid ring 30 and the elastic ring 28.

The radial lip 24C and the axial lips 24D, 24E, and 24F extend from the annular part 24B toward the second sealing member 26, and the distal ends of these lips are in contact with the second sealing member 26. These lips are formed from the elastic ring 28.

The second sealing member 26 may also be referred to as a slinger, that is, a rotational sealing member. The second sealing member 26 is mounted to the inner race 6, rotates together with the inner race 6, and acts to deflect exterior splashing of foreign matter.

In this embodiment, the second sealing member 26 also has a composite structure that includes an elastic ring 32 and a rigid ring 34. The rigid ring 34 is made of a rigid material such as a metal.

As viewed in cross section, the rigid ring 34 is substantially L-shaped. The rigid ring 34 includes a cylindrical sleeve 34A and an annular flange 34B that extends radially outward from the sleeve 34A. The sleeve 34A constitutes a mounted part that is to be mounted to the inner race 6. More specifically, an end portion of the inner race 6 is engaged by interference fit, namely, is press-fitted into the sleeve 34A.

The flange 34B is located radially outside the sleeve 34A, extends radially outward, and faces the annular part 24B of the first sealing member 24. In this embodiment, the flange 34B is a flat plate and lies on a plane that is perpendicular to the axis of the sleeve 34A. In this embodiment, the surface 34C of the flange 34B of the second sealing member 26 that faces the annular part 24B is parallel to the surface 24G of the annular part 24B of the first sealing member 24 that faces the flange 34B.

The elastic ring 32 is in close contact with the flange 34B of the rigid ring 34. In this embodiment, the elastic ring 32 serves to measure a rotational speed of the inner race 6. More specifically, the elastic ring 32 is formed from an elastomer material that contains a magnetic metal powder, and has a large number of S poles and N poles provided by the magnetic metal powder. In the elastic ring 32, a large number of S poles and N poles are alternately arranged at equiangular intervals in a circumferential direction. The angle of rotation of the elastic ring 32 is measured by use of a magnetic rotary encoder (not shown). However, use of the elastic ring 32 is not essential to the present invention.

The radial lip (grease lip) 24C of the first sealing member 24 extends radially inward from the inner end of the annular part 24B. The radial lip 24C extends toward the sleeve 34A of the second sealing member 26, and the distal end of the radial lip 24C is in contact with the sleeve 34A. The radial lip 24C extends radially inward and toward the outboard side, and has a primary role in preventing outflow of the lubricant from the inside of the hub bearing 1.

The axial lips (side lips) 24D, 24E, and 24F of the first sealing member 24 extend laterally from the annular part 24B. The distal ends of the axial lips 24D, 24E, and 24F extend radially outward toward the inboard side and are in contact with the surface 34C of the flange 34B of the second sealing member 26. Each of the axial lips 24D, 24E, and 24F has a primary role in preventing exterior intrusion of foreign matter into the hub bearing 1. Since the first sealing member 24 includes three axial lips 24D, 24E, and 24F, the sealing device has a superior ability to prevent intrusion of water into the sealed object (inside of the hub bearing 1).

The first sealing member 24 is mounted to the stationary outer race 8. On the other hand, the inner race 6 and the second sealing member 26 rotate, and the radial lip 24C and the axial lips 24D, 24E, and 24F slide on the second sealing member 26.

Compared to the radial lip 24C, the axial lips 24D, 24E, and 24F exert a smaller torque on the inner race 6, and consequently variation in sealing capability is minimal even if the inner race 6 is eccentric to the outer race 8.

Grease 38 is applied as a lubricant to the inner peripheral surfaces of the axial lips 24D, 24E, and 24F.

Figure 3:
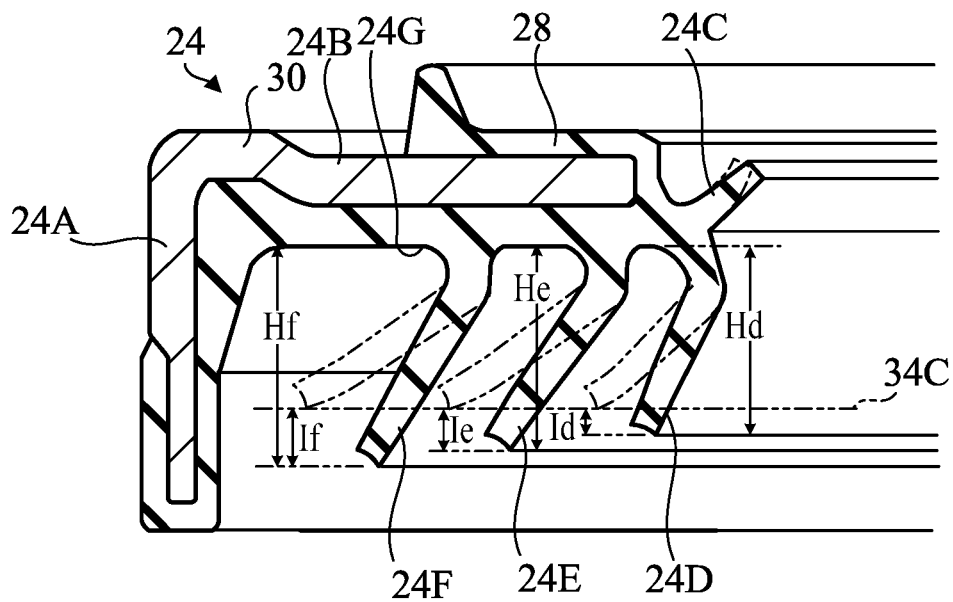
FIG. 3 is a partial cross-sectional view of a first sealing member of the sealing device in FIG. 2.

FIG. 3 is a partial cross-sectional view of the first sealing member 24. In FIG. 3, the radial lip 24C and the axial lips 24D, 24E, and 24F that do not come into contact with the second sealing member 26 and thus are not deformed are depicted by solid lines. The radial lip 24C and the axial lips 24D, 24E, and 24F that do come into contact with the second sealing member 26 and are thus deformed are depicted by phantom lines.

The interference If of the axial lip 24F that is arranged on the outermost side in radial directions is greater than the interference Ie of the axial lip 24E that is arranged intermediately. The interference Ie of the axial lip 24E is greater than the interference Id of the axial lip 24D that is arranged on the innermost side in radial directions.

The surface 24G corresponding to the base of the axial lips 24D, 24E, and 24F is parallel to the surface 34C of the flange 34B, with which the distal ends of the axial lips 24D, 24E, and 24F are in contact. Therefore, the height Hf of the axial lip 24F (the distance from the root to the distal end in the axial direction) is greater than the height He of the axial lip 24E that is arranged intermediately. In addition, the height He of the axial lip 24E is greater than the height Hd of the axial lip 24D that is arranged on the innermost side in radial directions.

Since the axial lip disposed radially on the outer side has an interference that is greater than that of the axial lip disposed radially on the inner side, the axial lip disposed radially on the outer side is more curved than the axial lip disposed on the radially inner side. Accordingly, as compared with the opposite case, more axial lips can be arranged in a narrower area. More specifically, three axial lips 24D, 24E, and 24F can be arranged in a narrower area. Alternatively, more than three axial lips can be arranged in the same area.

In addition, since the axial lip disposed radially on the outer side has an interference that is greater than that of the axial lip disposed radially on the inner side, it is easy to apply the grease 38 to each of the axial lips 24D, 24E, and 24F by supplying the grease 38 to the inner peripheral surface of each of the axial lips 24D, 24E, and 24F from radially inside the axial lips 24D, 24E, and 24F.

Figure 4:
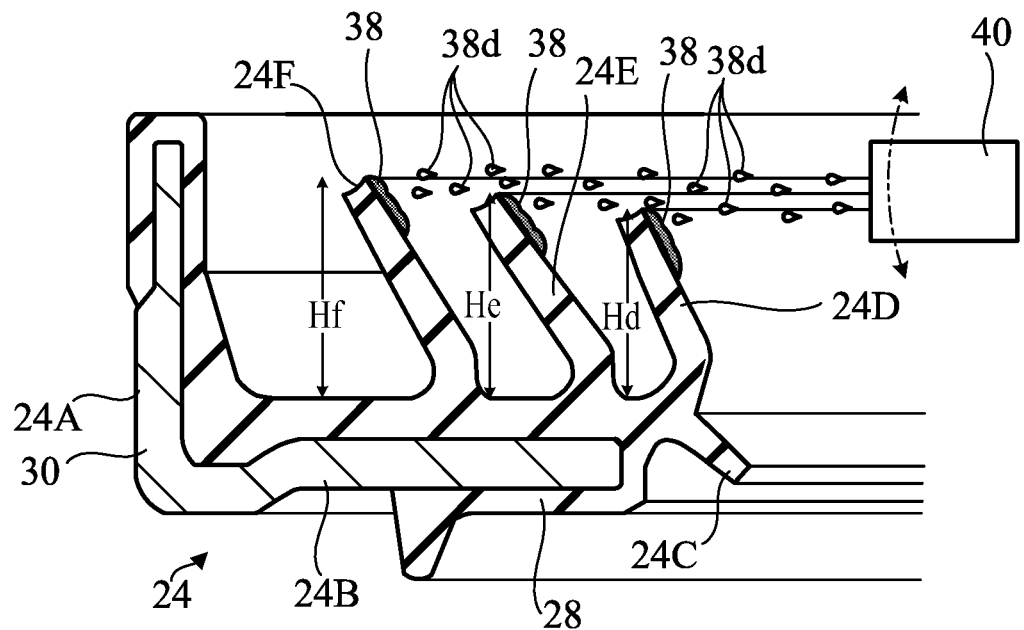
FIG. 4 is a diagram showing an example of a grease applying method according to an embodiment of the present invention.

FIG. 4 shows an example of a grease applying method according to the embodiment. In this method, a spraying nozzle 40 of a droplet ejecting device is located at a position radially inside the axial lip 24D arranged at the innermost side in radial directions. The spraying nozzle 40 sprays drops 38d of the grease 38 to apply the grease 38 to the inner peripheral surfaces of the axial lips 24D, 24E, and 24F at the same time.

Since Hf>He>Hd, even if the spraying nozzle 40 sprays drops 38d almost horizontally, the drops 38d are still able to reach the distal ends of the inner peripheral surfaces of all the axial lips 24D, 24E, and 24F. In this case, since the grease 38 can be applied to the inner peripheral surfaces of the axial lips 24D, 24E, and 24F by use of a single spraying nozzle 40 at the same time, the work rate is high. The spraying nozzle 40 may be swung as indicated by the phantom line.

As shown in FIG. 4, the axial lips 24D, 24E, and 24F should be directed upward and the annular part 24B should be directed downward prior to placement of the spraying nozzle 40. In this case, the grease 38 having reached the distal ends of the axial lips 24D, 24E, and 24F flows in a slight amount to the lower portions of the lips under gravity, whereby the grease 38 is applied to a wide area.

Figure 5:
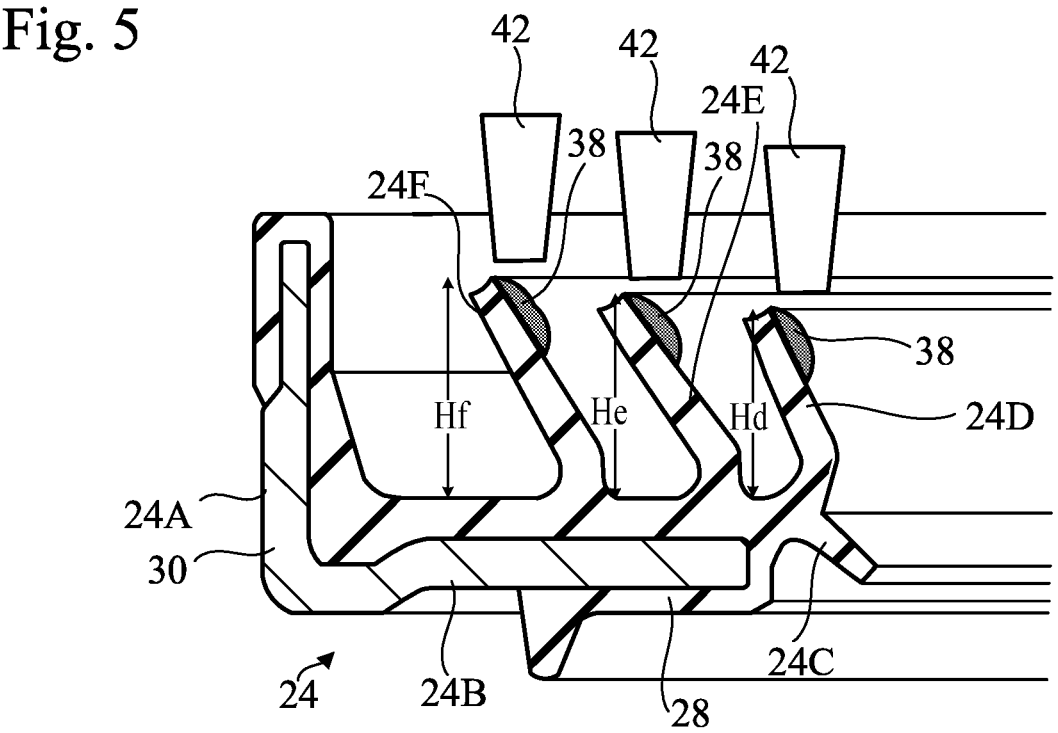
FIG. 5 is a diagram showing another example of a grease applying method according to an embodiment of the present invention.

FIG. 5 shows another example of a grease applying method according to the embodiment. In this method, the axial lips 24D, 24E, and 24F are directed upward and the annular part 24B is directed downward. By supplying the grease 38 to the inner peripheral surfaces of the axial lips 24D, 24E, and 24F by use of nozzles or pipettes 42 for supplying the grease, the grease 38 is applied to the inner peripheral surfaces of the axial lips 24D, 24E, and 24F.

Since Hf>He>Hd, the overlapping portion of the axial lips 24D and 24E and the overlapping portion of the axial lips 24E and 24F are smaller than those in the opposite case or in a case in which Hf=He=Hd. Accordingly, it is easy to deploy the distal ends of the nozzles or pipettes 42 to access the axial lips 24E and 24F, and thus it is easy to apply the grease 38 to the axial lips 24D, 24E, and 24F.

In the method shown in FIG. 5, the grease 38 is simultaneously applied to the axial lips 24D, 24E, and 24F by use of three nozzles or pipettes 42. If a single nozzle or pipette 42 is used, the grease 38 may be applied separately to the axial lips 24D, 24E, and 24F. Instead of using the nozzles or pipettes 42, the grease 38 may be applied to the axial lips 24D, 24E, and 24F with a brush or a stick.

In any of the above methods, the spraying nozzle 40, the nozzles or pipettes 42, or the first sealing member 24 may be rotated, so that the grease 38 may be applied to the inner peripheral surfaces of the axial lips 24D, 24E, and 24F over their entire circumference.

Alternatively, the grease 38 may be applied to a spot on the inner peripheral surface of each of the axial lips 24D, 24E, and 24F. In this way when the sealing device 21 is used, the axial lips 24D, 24E, and 24F slide on the flange 34B of the second sealing member 26, causing the grease 38 applied to a spot to spread across the entirety of the lip in the circumferential direction.

An embodiment of the present invention has been described above. However, the foregoing description is not intended to limit the present invention. Various modifications including omission, addition, and substitution of structural elements may be made in so far as such modifications remain within the scope of the present invention.

For example, in the above-described embodiment, the hub 4 and the inner race 6, which are inner members, are rotatable members, while the outer race 8, which is an outer member, is a stationary member. However, the present invention is not limited thereto, and may be configured such that multiple sealed members rotate relative to each other. For example, inner members may be stationary while an outer member may be rotatable, or all of the members may be rotatable.

The present invention is not limited to sealing the hub bearing 1. For example, the sealing device or the sealing structure according to the present invention may be applied to a differential gear mechanism or other power transmission mechanism of an automotive vehicle, to a bearing or other support mechanism for a drive shaft of an automotive vehicle, or to a bearing or other support mechanism of a rotary shaft of a pump.

The rigid ring 30 of the sealing device 21 in the embodiment consists of a single component. However, in place of the rigid ring 66, there may be employed multiple rigid rings that are provided radially apart from each other.

Although the sealing device 21 according to the embodiment has three axial lips 24D, 24E, and 24F, the sealing device 21 may have four or more axial lips.

REFERENCE SYMBOLS

1: Hub bearing (rolling bearing)
4: Hub (inner member)
6: Inner race (inner member)
8: Outer race (outer member)
21: Sealing device
24: First sealing member
26: Second sealing member
28: Elastic ring
30: Rigid ring
24A: Cylindrical part
24B: Annular part
24C: Radial lip
24D, 24E, 24F: Axial lip
34A: Sleeve
34B: Flange
38: Grease
38d: Drop
40: Spraying nozzle
42: Nozzle or pipette

The invention claimed is:

1. A sealing device disposed between an inner member and an outer member that rotate relative to each other, and that acts to seal a gap between the inner member and the outer member, the sealing device comprising:
a first sealing member comprising a cylindrical part to be mounted to the outer member, and an annular part that extends radially inward from the cylindrical part toward the inner member; and
a second sealing member comprising a sleeve to be mounted to the inner member, and a flange that extends radially outward from the sleeve, the flange facing the annular part of the first sealing member,
the first sealing member comprising at least three axial lips made from an elastic material that extends from the annular part toward a surface of the flange that faces the annular part,
wherein the at least three axial lips comprise an outermost lip, an intermediate lip, and an innermost lip,
a height of the outermost lip is greater than a height of the intermediate lip such that an interference between the outermost lip and the second sealing member is greater than an interference between the intermediate lip and the second sealing member,
the height of the intermediate lip is greater than a height of the innermost lip such that the interference between the intermediate lip and the second sealing member is greater than an interference between the innermost lip and the second sealing member.

2. A method for applying grease to an inner peripheral surface of each of the at least three axial lips of the sealing device according to claim 1, comprising:
supplying the grease to the inner peripheral surface of each of the at least three axial lips from radially inside the at least three axial lips.

3. The method according to claim 2, wherein supplying the grease to the inner peripheral surface of each of the at least three axial lips comprises spraying drops of the grease from a position that is radially inside each of the at least three axial lips, thereby applying the grease to the inner peripheral surface of each of the at least three axial lips simultaneously.

* * * * *